(12) United States Patent
Tsuji et al.

(10) Patent No.: US 9,421,872 B2
(45) Date of Patent: Aug. 23, 2016

(54) VEHICLE AND BATTERY PACK

(71) Applicant: Yamaha Hatsudoki Kabushiki Kaisha, Iwata-shi, Shizuoka (JP)

(72) Inventors: Shinji Tsuji, Shizuoka (JP); Masakazu Takano, Shizuoka (JP); Junichi Inami, Shizuoka (JP); Toshinori Miyazaki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/533,478

(22) Filed: Nov. 5, 2014

(65) Prior Publication Data
US 2015/0127206 A1 May 7, 2015

(30) Foreign Application Priority Data

Nov. 6, 2013 (JP) ................................. 2013-230723

(51) Int. Cl.
*B60L 3/00* (2006.01)
*B60L 11/00* (2006.01)
*B60L 11/18* (2006.01)
*H02J 7/00* (2006.01)
*H01M 10/42* (2006.01)

(52) U.S. Cl.
CPC ............ *B60L 11/007* (2013.01); *B60L 3/0046* (2013.01); *B60L 11/1822* (2013.01); *B60L 11/1877* (2013.01); *B60L 11/1879* (2013.01); *H02J 7/0004* (2013.01); *H02J 7/0054* (2013.01); *B60L 2200/12* (2013.01); *H01M 10/4207* (2013.01); *H01M 2010/4271* (2013.01); *H01M 2220/20* (2013.01); *Y02T 10/7005* (2013.01); *Y02T 10/705* (2013.01); *Y02T 10/7072* (2013.01); *Y02T 90/124* (2013.01); *Y02T 90/14* (2013.01); *Y02T 90/16* (2013.01)

(58) Field of Classification Search
None
See application file for complete search history.

(56) References Cited

U.S. PATENT DOCUMENTS

| | | |
|---|---|---|
| 5,477,936 A | 12/1995 | Sugioka et al. |
| 5,681,668 A | 10/1997 | Reed et al. |
| 2005/0177285 A1 | 8/2005 | Honda |
| 2005/0217910 A1 | 10/2005 | Yonehana et al. |
| 2010/0018787 A1 | 1/2010 | Plazotta et al. |
| 2012/0103716 A1 | 5/2012 | Fujihara et al. |

(Continued)

FOREIGN PATENT DOCUMENTS

| | | |
|---|---|---|
| CN | 202260522 U | 5/2012 |
| EP | 1 462 299 A1 | 9/2004 |
| EP | 2 280 436 A2 | 2/2011 |
| EP | 2595216 A1 | 5/2013 |
| EP | 2 612 805 A1 | 7/2013 |
| EP | 2 623 404 A1 | 8/2013 |
| GB | 2 422 717 A | 8/2006 |

(Continued)

OTHER PUBLICATIONS

Official Communication issued in corresponding European Patent Application No. 14192016.5, mailed on Dec. 18, 2015.

*Primary Examiner* — Thomas Tarcza
*Assistant Examiner* — Garrett Evans
(74) *Attorney, Agent, or Firm* — Keating and Bennett, LLP

(57) ABSTRACT

A vehicle includes a plurality of detachable battery packs that accommodate a rechargeable battery module and a battery management system (BMS) in a case. In a state where the battery pack is installed in the vehicle, the BMS performs information communication with another BMS, and one BMS is a master and communicates with another BMS which is a slave and combines information of the battery packs. In a state where the battery pack is detached from the vehicle, a control of a charging state is independently performed by the BMS with respect to the rechargeable battery module.

9 Claims, 10 Drawing Sheets

(56) References Cited

U.S. PATENT DOCUMENTS

| | | |
|---|---|---|
| 2013/0096762 A1 | 4/2013 | Houchin-Miller et al. |
| 2013/0216885 A1 | 8/2013 | Kawatani et al. |
| 2013/0249475 A1* | 9/2013 | Kang .................... H02J 7/0042 320/107 |
| 2013/0307478 A1* | 11/2013 | Boggs ....................... B60L 3/00 320/112 |
| 2014/0262568 A1 | 9/2014 | Matsuda et al. |

FOREIGN PATENT DOCUMENTS

| | | |
|---|---|---|
| GB | 2494187 A | 3/2013 |
| JP | 05-330465 A | 12/1993 |
| JP | 2001-114157 A | 4/2001 |
| JP | 2010-18270 A | 1/2010 |
| JP | 2010-36791 A | 2/2010 |
| JP | 5219992 B2 | 6/2013 |
| WO | 2013/061387 A1 | 5/2013 |

* cited by examiner

VEHICLE AND BATTERY PACK

CROSS-REFERENCE TO RELATED APPLICATION

The present application claims priority to Japanese Patent Application No. 2013-230723 filed in the Japan Patent Office on Nov. 6, 2013, the entire contents of which are hereby incorporated by reference.

BACKGROUND OF THE INVENTION

1. Field of the Invention

The present invention relates to a vehicle and a battery pack.

2. Description of the Related Art

In an electric vehicle or in a portion of a so-called hybrid vehicle which is provided with both a motor and an electric motor, it is required that a rechargeable battery which stores electric power be installed on the vehicle and that the rechargeable battery be charged prior to traveling.

In JP 5-330465 A, an electric scooter is disclosed which includes a plurality of batteries installed thereon. In the electric scooter disclosed in JP 5-330465 A, a single charge control microcomputer is provided in the vehicle, and a charge to a battery assembly body is provided by connecting a connector and an outlet of a commercial power supply.

In JP 5219992 B, an electric vehicle is disclosed which includes a battery pack including a battery module and a BMU of the lithium ion type as a main battery. In the electric vehicle of JP 5219992 B, a main battery charging is performed by connecting a charging plug of a charger to a charging socket provided in the vehicle, and by connecting a power supply plug of the charger to an AC 100V outlet.

SUMMARY OF THE INVENTION

When it is desired that the electric vehicle has sufficient output and range during traveling, a size of the battery becomes large and a weight of the battery becomes heavy, and thus, it is difficult to detach the battery from a vehicle and to carry the battery by hand. For this reason, as disclosed in the above-described related art, in general, battery charging is performed by connecting the vehicle and a commercial power supply to each other in a state where the battery is installed in the vehicle.

However, in this method, a restriction is caused in which the vehicle is parked in a parking lot where a commercial power supply is provided in order to charge the battery. This restriction causes a result in which the convenience of a light vehicle, such as a saddle type vehicle including a motorcycle, which is relatively easy to select a parking place, is significantly reduced. A saddle type vehicle includes vehicles of a type in which a driver sits astride on a saddle, and includes various types of vehicles, such as a motorcycle, a three-wheeled or four-wheeled buggy which is referred to as an all-terrain vehicle (ATV) or a recreational off-highway vehicle (ROV), a snowmobile, or an electric assist bicycle.

Preferred embodiments of the present invention have been made in view of the circumstances described above, and provide a vehicle in which a battery pack which is configured to be simply detached from the vehicle, carried, and charged is installed.

Preferred embodiments of the present invention disclosed in the present application have various aspects, and an outline of the representative aspects is as follows.

According to a preferred embodiment of the present invention, a vehicle includes a plurality of detachable battery packs that accommodate a rechargeable battery module and a battery management system (BMS) in a case. In a state where the battery pack is installed in the vehicle, the BMS performs information communication with another BMS, and one BMS is a master and communicates with another BMS which is a slave and combines information of the battery packs. In a state where the battery pack is detached from the vehicle, a control of a charging state is independently performed by the BMS with respect to the rechargeable battery module.

In a preferred embodiment of the present invention, the battery pack preferably is charged in a state of being detached from the vehicle.

In a preferred embodiment of the present invention, the vehicle preferably further includes a vehicle side controller. With the BMS that is the master combined information of the battery packs is transmitted to the vehicle side controller.

In a preferred embodiment of the present invention, the battery pack preferably further includes a master/slave discrimination portion. The master/slave discrimination portion preferably determines whether the BMS related to the battery pack is the master or the slave based on an installation state of the battery pack in the vehicle.

In a preferred embodiment of the present invention, the battery pack preferably includes a battery pack side connector to electrically connect the battery pack with the vehicle. In the battery pack side connector, a master/slave designation contact point is included in which a master/slave determination signal to designate the BMS related to the battery pack as the master or the slave is input.

In a preferred embodiment of the present invention, the battery pack preferably includes a battery pack side switch which blocks an output from the rechargeable battery module. The battery pack side switch is preferably controlled to be either ON or OFF by a signal from outside the battery pack.

In a preferred embodiment of the present invention, the vehicle preferably includes a vehicle side switch which blocks an input from the battery pack. The vehicle side switch is controlled to be ON on the condition that all of the battery pack side switches are ON.

In a preferred embodiment of the present invention, the battery pack side switch is preferably controlled to be OFF on the condition that the vehicle side switch is OFF.

According to another preferred embodiment of the present invention, a battery pack includes a rechargeable battery module; a BMS; a case which accommodates the rechargeable battery module and the BMS; and a master/slave discrimination portion which determines whether the BMS is a master or a slave based on an installation state in a vehicle. In a state where the battery pack is installed in the vehicle, the BMS performs information communication with another BMS, and one BMS is the master and communicates with another BMS which is the slave and combines information of the battery packs. In a state where the battery pack is detached from the vehicle, a control of a charging state is independently performed by the BMS with respect to the rechargeable battery module.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
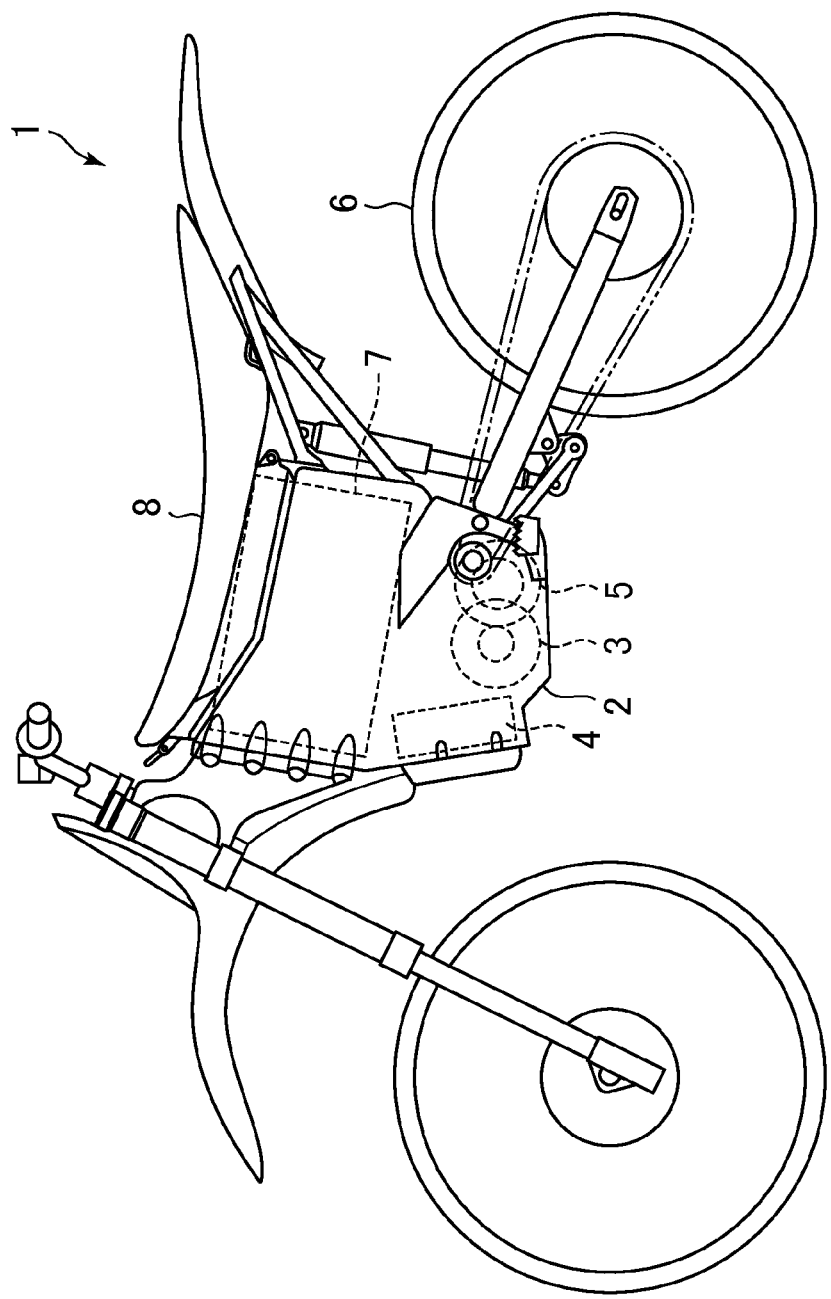
FIG. 1 is an outer appearance side surface view of a vehicle according to a preferred embodiment of the present invention.

FIG. 1 is an outer appearance side surface view of a vehicle 1 according to a preferred embodiment of the present invention. The vehicle 1 preferably is, for example, an electric motorcycle in which an electric motor 3 and an electric circuit 4, such as an engine control unit (ECU) or an inverter, are installed in a monocoque type frame 2, and which reduces a speed of a rotational output by the electric motor 3 by a speed reducer 5 and transfers the rotational output to a rear wheel 6.

The type of the vehicle 1 is not limited to a motorcycle, and may be another type of vehicle. In addition, the vehicle 1 may be provided with a motor other than the electric motor 3, and may be a vehicle of the so-called hybrid type. Furthermore, the frame 2 preferably is a monocoque type, but may be a pipe or a pressed frame other than the monocoque type, for example.

A battery pack 7, which is installed in the vehicle 1 and is a power source for the electric motor 3, is accommodated in a box-shaped battery pack accommodation portion defined by the frame 2, and is disposed below a saddle 8. Ina preferred embodiment, charging of the battery pack 7 is performed by detaching the battery pack from the vehicle 1. For this reason, the battery pack 7 is configured to be easily detached from the vehicle 1, that is, the battery pack 7 is capable of being attached to and detached from the vehicle 1 without using any tools.

Figure 2:
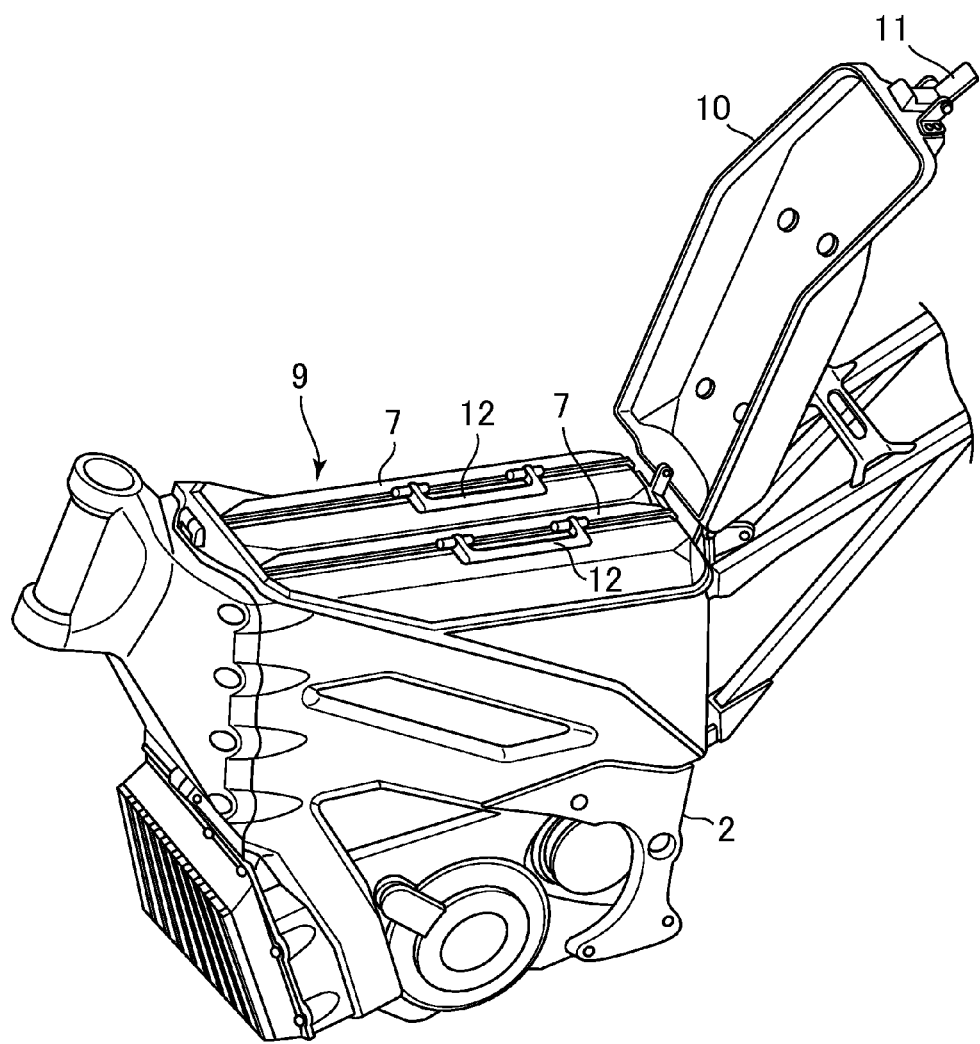
FIG. 2 is a perspective view illustrating a structure of the vicinity of a battery pack accommodation portion of a frame.

FIG. 2 is a perspective view illustrating a structure of the vicinity of a battery pack accommodation portion 9 of the frame 2. The battery pack accommodation portion 9 is, for example, a box-shaped space which opens upward, and is accessible from the outside by detaching the saddle 8 from the vehicle 1 and opening a lid 10 provided on an upper portion of the frame 2. The lid 10 is capable of being opened by a simple method which does not use a tool, for example, by unfastening a latch 11 provided on the end portion of the lid 10.

As illustrated in the drawings, a plurality (two battery packs in the example in the drawings) of battery packs 7 is installed on the vehicle 1. A size and a weight of one battery pack 7 is appropriate for carrying by hand. For example, since the weight of the battery pack 7 is designed to be equal to or less than 10 kg, a sufficient output and range is obtained when the vehicle 1 travels using a single battery pack 7. Preferably, as many as needed of the plurality of battery packs 7 are installed on the vehicle 1, and electric power is supplied to the vehicle 1 from each of the battery packs 7 at the same time when the vehicle 1 is traveling. Accordingly, it is possible to achieve both a convenience of carrying the battery pack 7 by hand and a guarantee that the vehicle 1 has the necessary output and range.

Preferably, the common battery pack 7 may be used in a plurality of types of vehicles, and as many as a number of the battery packs 7 that are needed according to a required specification of the type of the vehicle. According to this configuration, it is advantageous that it is possible to flexibly respond to various requirements without a necessity of revising the design of the battery pack 7 of every type of vehicle. In addition, since the battery pack 7 is easily attached and detached, for example, in an event, such as a racing event, by preparing a charged reserve battery pack 7 and exchanging the battery pack 7 as necessary, it is possible to travel for a long period of time even at a location where there is no charging equipment.

On an upper surface of the battery pack 7, a handle 12 is provided. By pulling up the battery pack 7 with the handle 12, it is possible to detach the battery pack 7 from the vehicle 1 in an extremely simple manner. Attaching the battery pack 7 is just as simple as detaching the battery pack 7.

Here, the term "battery pack" indicates a rechargeable battery module provided in a case, the battery module is provided with one or a plurality, if necessary, of battery cells which store the electric power, so that the battery module is handled easily and safely by itself. In order to supply the sufficient electric power for practical traveling of the vehicle 1, it is desirable to select a rechargeable battery module having an energy density as high as possible. At present, examples include a lithium ion battery, a lithium ion capacitor, or the like. However, it is been discovered that a high level of voltage and current control of a rechargeable battery is necessary while charging and discharging, and a control circuit which is called a BMS is used in order to control the charging and discharging, to recognize an accurate remaining charging capacity, and to perform a regenerative control.

In a preferred embodiment of the present invention, each of the battery packs 7 is easily detached from the vehicle, respectively charged, and individually exchanged. For this reason, the BMS is provided in every battery pack 7, and the charging state when the battery pack 7 is independently charged is controlled. In other words, the battery pack 7 according to a preferred embodiment includes a rechargeable battery and the BMS, which are respectively accommodated in a case. Examples of controlling the charging state by the BMS when charging the battery pack 7 include appropriately controlling a current, voltage, or both of the charging electric power which is input to every rechargeable battery module or battery cell (for example, a constant current control or a constant voltage control); and monitoring a voltage and/or a temperature to prevent an accident, damage, deterioration of life span due to an overcharge, or an increase in temperature, and appropriately blocking the charging electric power.

Figure 3:
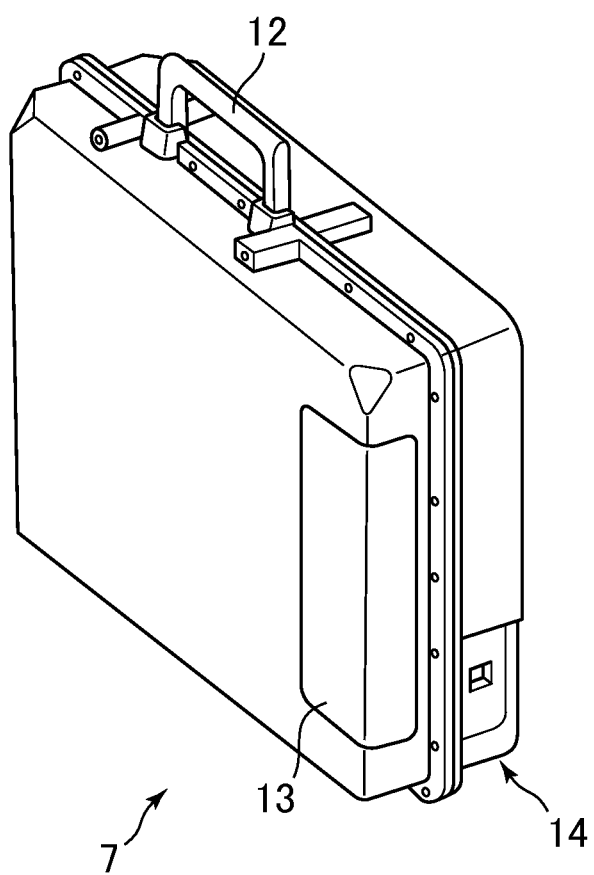
FIG. 3 is an outer appearance perspective view of a battery pack.

FIG. 3 is an outer appearance perspective view of the battery pack 7. The entire battery pack 7 has the shape of a trunk case, for example, and a heat sink 13 to cool the BMS is exposed at a portion of the battery pack 7. In addition, a battery pack side connector 14 to electrically connect with the vehicle 1 is provided on a lower portion of the battery pack 7. When the battery pack 7 is accommodated in the battery pack accommodation portion 9 (refer to FIG. 2), the battery pack side connector 14 is in contact with and is electrically connected with a vehicle side connector provided in the battery pack accommodation portion 9.

Figure 4:
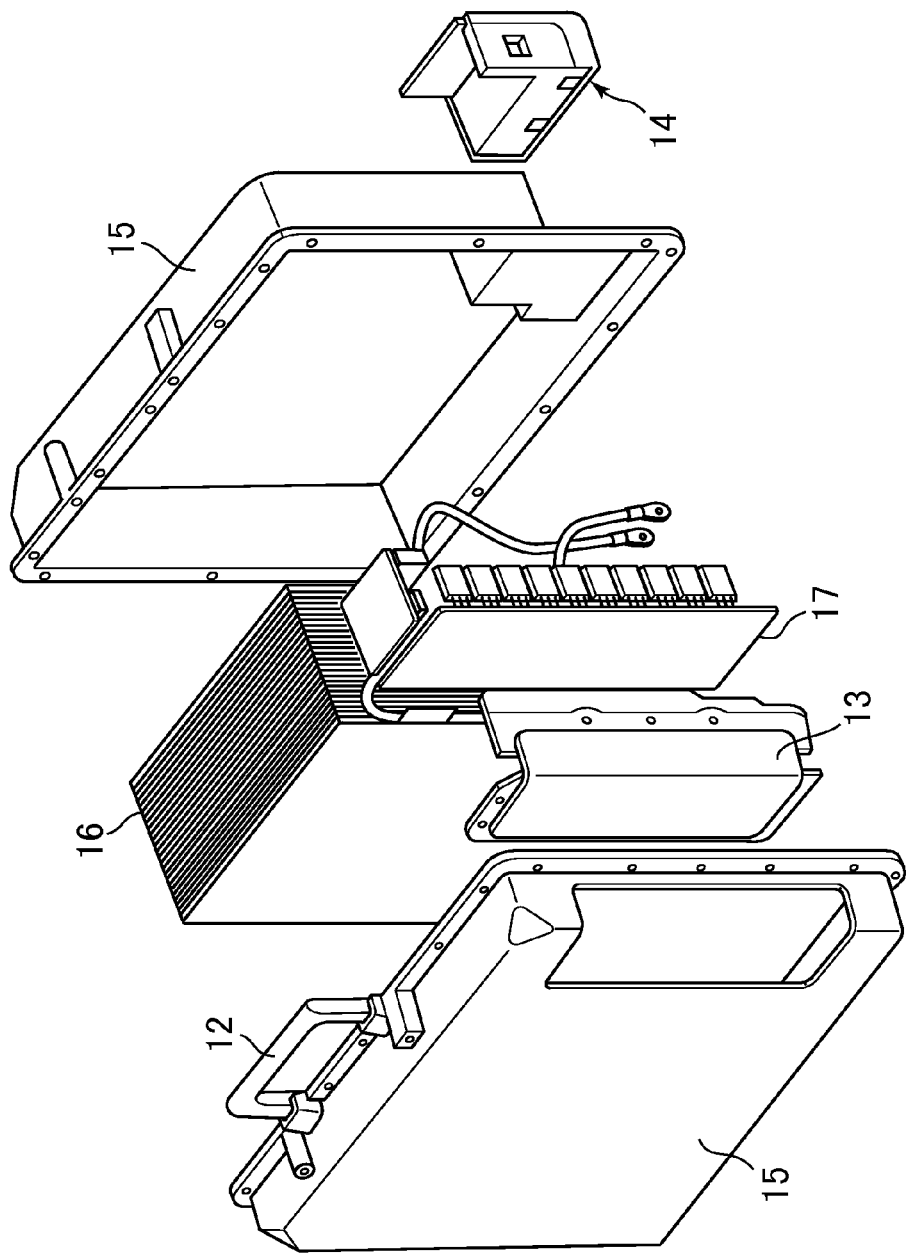
FIG. 4 is an exploded perspective view of the battery pack.

FIG. 4 is an exploded perspective view of the battery pack 7. The battery pack 7 accommodates a rechargeable battery module 16 and a BMS 17 in a case 15. A material of the case 15 is an appropriate material, and may be an arbitrary synthetic resin, a fiber-reinforced synthetic resin, or a metal, for example. However, a material having shock resistance is preferable, and further, a material having an insulation property is preferable so that the high voltage maintained in the rechargeable battery module does not flow out to the outside when the case 15 is deformed or damaged. For example, in a preferred embodiment of the present invention, an ABS resin material is used. The case 15 is preferably divided into two at a surface that is perpendicular or substantially perpendicular to the battery pack 7.

In order to dissipate heat while operating, the BMS 17 is configured to bring the heat sink 13 into thermal contact with a field effect transistor (FET) and a substrate which are close together, and dissipate the heat to the outside of the battery pack 7.

Figure 5:
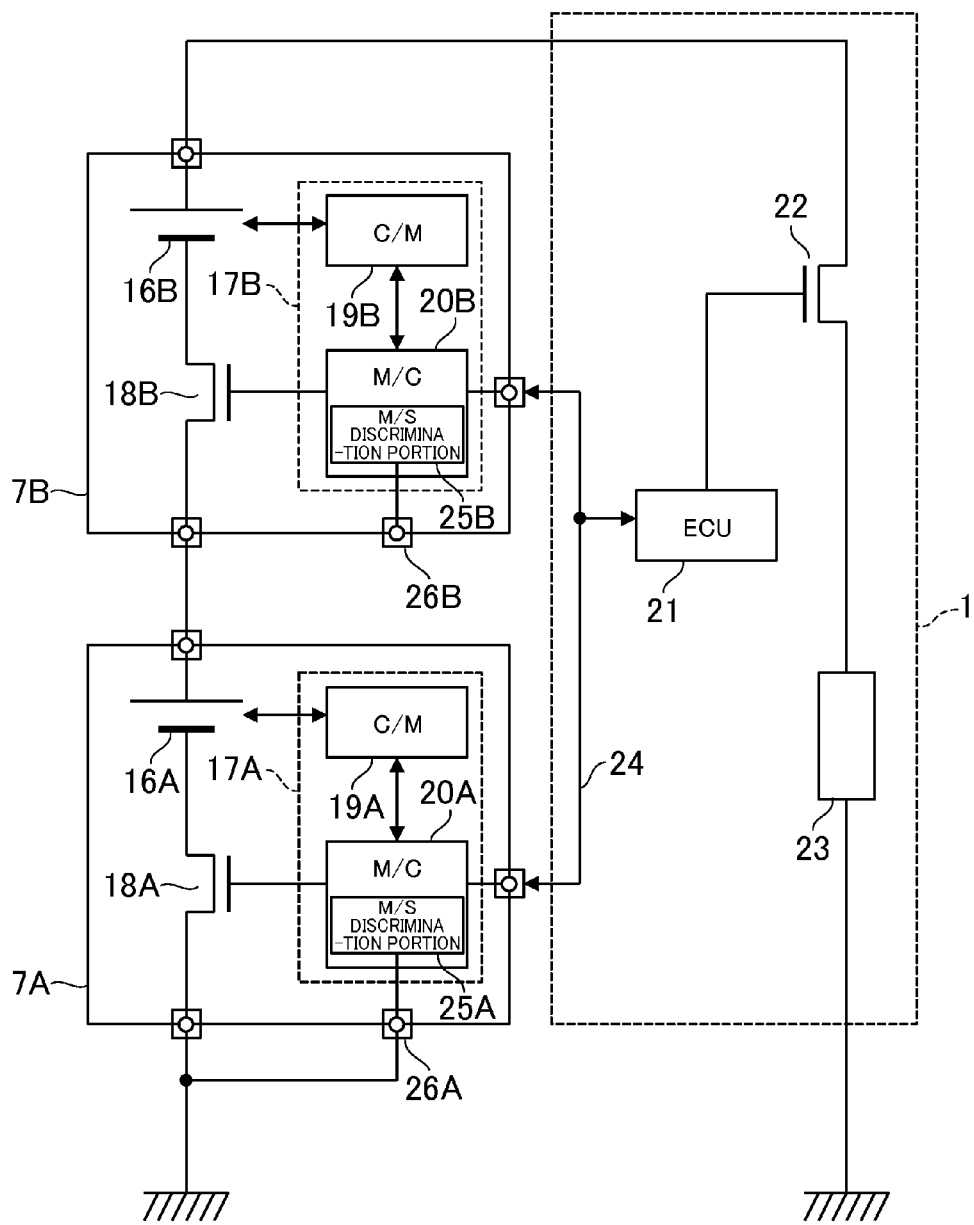
FIG. 5 is a circuit diagram illustrating an electric system of the vehicle.

FIG. 5 is a circuit diagram illustrating an electric system of the vehicle 1. Since two battery packs 7 are installed in the vehicle 1 according to the present preferred embodiment, in order to distinguish each of the battery packs 7, reference numerals are respectively given suffixes A and B, as necessary.

A battery pack 7A and a battery pack 7B are preferably of the same type, and are provided with the rechargeable battery module 16, the BMS 17, and further, a battery pack side switch 18, which is a switch that blocks the output to the outside from the rechargeable battery module 16, on the inside thereof. The battery pack side switch 18 is preferably an analog switch, and specifically, the battery pack side switch 18 may include an FET, for example. In addition, the battery pack side switch 18 is provided on a negative electrode side of the rechargeable battery module 16 in FIG. 5, but may be provided on a positive electrode side of the rechargeable battery module 16 or may be provided on both sides.

The BMS 17 preferably includes a cell monitor (C/M) 19, which is preferably an integrated circuit (IC) configured or programmed to monitor the voltage or the temperature of each cell included in the rechargeable battery module 16, and an M/C 20 which is an information processing circuit that controls the battery pack side switch 18 and the C/M 19 and communicates with a controller on the vehicle 1 side. The M/C 20 is preferably a microcontroller. However, the specific configuration is arbitrary, and the M/C 20 may be a general-purpose information processing apparatus, such as a computer made of a general central processing unit (CPU) and a memory, or a field programmable gate array (FPGA), and may be an information processing apparatus for a certain purpose, such as a digital signal processor (DSP), or an application specific integrated circuit (ASIC). In addition, the M/C 20 may be a single integrated circuit, may include a plurality of integrated circuits and peripheral circuits thereof, or may include a so-called communication controller.

A rechargeable battery module 16A and a rechargeable battery module 16B are connected to each other in series in the present preferred embodiment.

In addition, an ECU 21 which functions as a vehicle side controller that communicates with the M/C 20 is provided on the vehicle 1 side. The ECU 21 is preferably an information processing apparatus which electrically controls the entire vehicle 1, such as various types of electric components or meters provided in the vehicle 1, in addition to a rotational output of the electric motor 3 (refer to FIG. 1) according to an accelerator operation amount by an occupant or a state of the vehicle 1. However, the vehicle side controller, which communicates with the M/C 20, may be separate from the ECU 21, and the vehicle side controller and the ECU 21 may be configured to perform information communication. The ECU 21 may also be an arbitrary information processing apparatus, and may be a microcontroller, a general computer, an FPGA, a DSP, an ASIC, or the like.

The electric power input from the battery pack 7 to the vehicle 1 is transferred to a load 23 via a vehicle side switch 22, which is a switch to block the input of the electric power to the load 23. The load 23 is illustrated by adding impedance of each electric component provided in the vehicle 1, including the above-described electric motor 3. In FIG. 5, the vehicle side switch 22 is provided on a high potential side (that is, the battery pack 7 side) with respect to the load 23. However, the position is not particularly limited. The vehicle side switch 22 may be on a low potential side (that is, a ground side) of the load 23 and may be provided in the middle of the load 23, or a plurality of vehicle side switches 22 may be provided.

A communication line 24 between the M/C 20 and the ECU 21 may be used if at least one M/C 20 among the plurality of M/Cs 20 and the ECU 21 communicate with each other. However, in a preferred embodiment, the communication line 24, which is based on a control area network (CAN) standard, is used. Certainly, a communication standard other than the CAN, for example, a local interconnect network (LIN), may be used.

However, as illustrated in FIG. 5, in a state where the plurality of battery packs 7 are provided and the plurality of M/Cs 20 and the ECU 21 communicate with each other, it is not possible to discriminate which battery pack 7 includes the M/C 20 that communicates with the ECU 21, and it is not possible to exactly understand not only a state of each of the battery packs 7A and 7B but also a state of the entire battery pack 7.

In a preferred embodiment, one of the plurality of battery packs 7 is set to be a master battery pack, and the rest of the battery packs 7 are set to be slave battery packs. The BMS 17 of the battery pack 7 which is the master communicates with the BMS 17 of the slave, collects information about the battery pack 7 of the slave, and transmits the information by communicating with the ECU 21 representing the entire battery pack 7.

In the example illustrated in FIG. 5, the battery pack 7A is the master, and the battery pack 7B is the slave. For this reason, a BMS 17A, which is the master, communicates with a BMS 17B which is the slave, collects information about the battery pack 7B, and transmits the information of the battery pack 7B to the ECU 21 together with information about the battery pack 7A.

At this time, how to determine which battery pack 7 is the master among the plurality of battery packs is a problem. In the most simple manner, preparing two types of the battery pack 7 including the battery pack 7 which functions as the master and the battery pack 7 which functions as the slave may be considered. In a preferred embodiment of the present invention, it is not necessary to exclude this configuration.

However, this configuration is not always preferable since there are several problems in that the cost increases when a plurality of types of battery pack 7 is provided, or that a human error (for example, there is a possibility that a plurality of master battery packs are installed, or that only slave battery packs are installed) is likely to occur when installing the battery pack 7.

According to a preferred embodiment, a master/slave discrimination portion 25 is provided in the battery pack 7, and it is determined whether the battery pack is a master or a slave based on the installation state of the battery pack 7 in the vehicle 1. In addition, in a preferred embodiment, since the master/slave discrimination portion 25 is preferably realized by software which operates on the M/C 20, the master/slave discrimination portion 25 is illustrated as being inside the M/C 20 in FIG. 5. However, the master/slave discrimination portion 25 may be provided as a circuit separate from the M/C 20, or the master/slave discrimination portion 25 may be provided independently from the BMS 17.

The installation state of the battery pack 7 in the vehicle 1, which is discriminated by the master/slave discrimination portion 25, indicates information which is obtained by distinguishing a battery pack 7 with respect to the other battery packs 7. For example, a position of the battery pack 7 in the battery pack accommodation portion 9 (refer to FIG. 2) or an order of attaching the battery pack 7 to the vehicle 1, may correspond to the installation state which is referred to here.

In a preferred embodiment, in the battery pack 7, a master/slave designation contact point 26 is provided in the battery pack side connector 14, and a master/slave determination signal which designates whether the battery pack 7 is set to be the master or the slave is input. In one of the vehicle side connectors, which is provided in the battery pack accommodation portion 9 of the vehicle 1, a specific signal which designates that the battery pack is the master is input to the master/slave designation contact point 26, and a signal which designates that the battery pack is the slave is input to the master/slave designation contact point 26 in another vehicle side connector.

In the example of FIG. 5, a master/slave designation contact point 26A of the battery pack 7A, which is the master, is connected to a battery GND, and a low potential is given as the master/slave determination signal. A master/slave discrimination portion 25A detects the low potential, and recognizes that the battery pack of the master/slave discrimination portion 25A is the master.

Meanwhile, a master/slave designation contact point 26B of the battery pack 7B, which is the slave, is not connected to the battery GND, and a high potential is given as the master/slave determination signal to be in a floating state. A master/slave discrimination portion 25B detects the high potential, and recognizes that the battery pack of the master/slave discrimination portion 25B is the slave.

The discrimination by the master/slave discrimination portion 25 may be performed by another method, for example, a method in which the battery pack recognizes itself as the master by being installed initially in the vehicle 1, and a method in which a mechanical switch that makes it possible to access to the battery pack 7 from the outside is provided and the mechanical switch is operated when the battery pack 7 is accommodated at a specific position of the battery pack accommodation portion 9 of the vehicle 1.

However, the battery pack side switch 18 that is provided in the battery pack 7 is OFF (that is, a state where the output from the rechargeable battery module 16 is blocked) when the battery pack is not installed in the vehicle 1, and is ON when the vehicle 1 travels. In addition, the vehicle side switch 22 that is provided in the vehicle 1 is ON at least when the vehicle 1 travels, and the ON and OFF of the vehicle side switch 22 is controlled according to a main switch of the vehicle 1 in a preferred embodiment of the present invention. The ON and OFF of all of the switches are directly or indirectly controlled by a command from the ECU 21.

In other words, the battery pack side switch 18 is controlled to be either ON or OFF by a signal from the outside of the battery pack 7. Accordingly, even when the plurality of battery packs 7 are used at the same time, it is possible to uniformly handle a presence or an absence of the output from each of the battery packs 7. In addition, when the battery pack 7 is detached from the vehicle 1, there is no difficulty in detecting the detachment of the battery pack 7 and automatically making the battery pack side switch 18 OFF. The control of the battery pack side switch 18 at that time may be performed by the BMS 17, or a dedicated circuit may be provided.

When the battery pack 7 is installed in the vehicle 1, only on the condition that the battery pack side switches 18 of all of the battery packs 7 are ON, the ECU 21 controls the switches to allow the vehicle side switch 22 to be ON. In other words, when the battery pack side switch 18 of any of the battery packs 7 is OFF, the vehicle side switch 22 is prohibited from being ON. The reasons thereof will be described by reference to FIGS. 6 to 9.

FIGS. 6 to 9 are views simplifying and illustrating the circuit diagram in FIG. 5. Here, a battery pack side switch 18A, a battery pack side switch 18B, and the vehicle side switch 22 are illustrated in a manner clarifying the ON and OFF states thereof.

Figure 6:
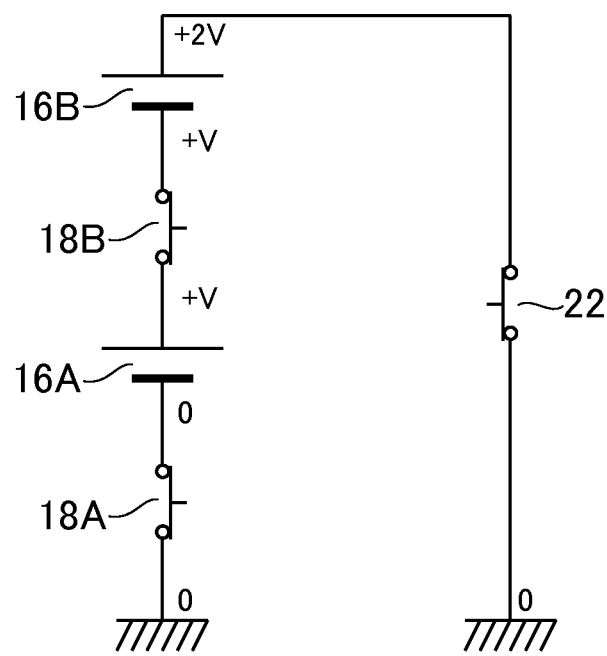
FIG. 6 is a view simplifying and illustrating the circuit diagram in FIG. 5.

FIG. 6 illustrates a state where all of the battery pack side switch 18A, the battery pack side switch 18B, and the vehicle side switch 22 are ON. Here, if voltage between terminals of the rechargeable battery module 16 is +V, a voltage value in each place in the circuit is as illustrated in the drawing, a potential difference between both ends of the battery pack side switch 18A and the battery pack side switch 18B is zero, and a potential difference between both ends of the vehicle side switch 22 is 2V. According to this configuration, as an element which is used in the vehicle side switch 22, at least an element which has a pressure resistance of 2V should be selected.

Figure 7:
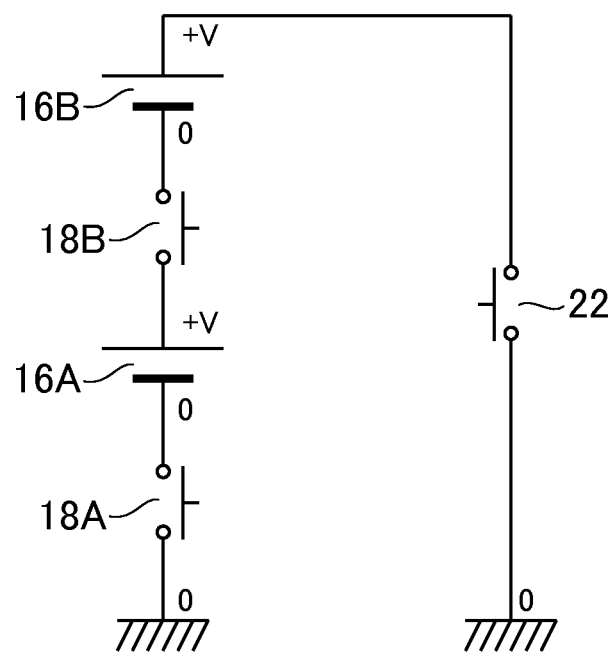
FIG. 7 is a view simplifying and illustrating the circuit diagram in FIG. 5.

FIG. 7 illustrates a state where all of the battery pack side switch 18A, the battery pack side switch 18B, and the vehicle side switch 22 are OFF. At this time, a voltage value in each place in the circuit is as illustrated in the drawing, and a potential difference between both ends of the battery pack side switch 18A is zero, but a potential difference between both ends of the battery pack side switch 18B and the vehicle side switch 22 is V. According to this configuration, as an element which is used in the battery pack side switch 18, at least an element which has a pressure resistance of V should be selected.

Figure 8:
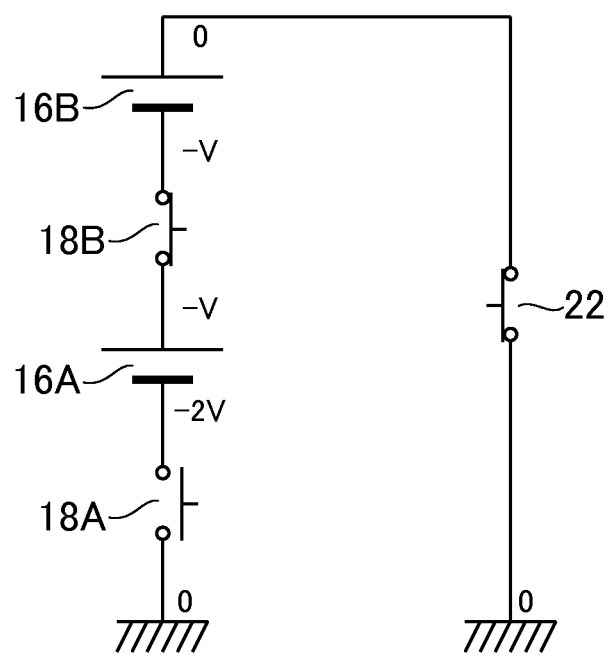
FIG. 8 is a view simplifying and illustrating the circuit diagram in FIG. 5.
Figure 9:
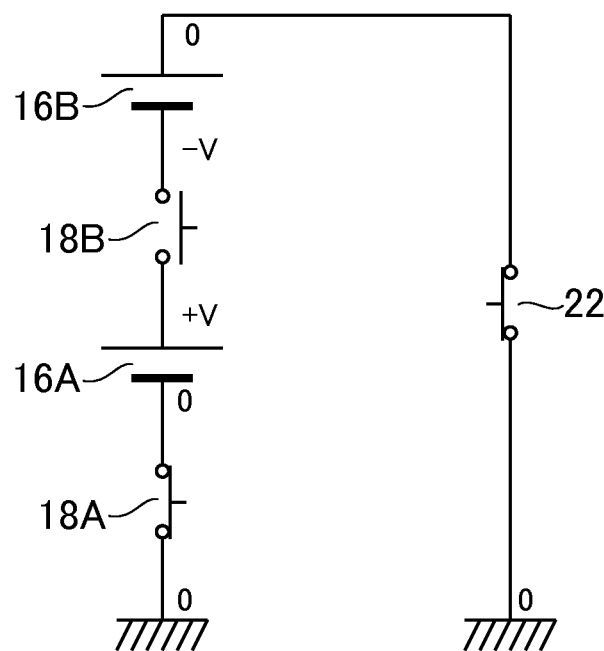
FIG. 9 is a view simplifying and illustrating the circuit diagram in FIG. 5.

However, as illustrated in FIG. 8, considering that only the battery pack side switch 18A is OFF and the battery pack side switch 18B and the vehicle side switch 22 are ON, a voltage value in each place in the circuit is as illustrated in the drawing, and a potential difference between both ends of the battery pack side switch 18A is 2V. As illustrated in FIG. 9, a similar phenomenon occurs even when only the battery pack side switch 18B is OFF, and the battery pack side switch 18A and the vehicle side switch 22 are ON. In this case, the potential difference between both ends of the battery pack side switch 18B is about 2V, for example.

In order to prevent damage to the battery pack side switch 18 due to the potential difference between both ends, the pressure resistance of the battery pack side switch 18 may be equal to or greater than about 2V which is equivalent to that of the vehicle side switch 22, but the element having a high pressure resistance is expensive, and causes an increase in the cost of the battery pack 7.

Only on the condition that the battery pack side switches 18 of all of the battery packs 7 are ON, if the ECU 21 controls the vehicle side switch 22 to be ON, it is possible to avoid the states illustrated in FIGS. 8 and 9, and to use a switch having a pressure resistance which is at least about 2 V as the battery pack side switch 18, for example. Accordingly, while preventing damage to the battery pack side switch 18 due to the potential difference between both ends, it is possible to use an element having a minimum level of pressure resistance as the battery pack side switch 18, and to reduce a manufacturing cost of the battery pack 7.

A similar phenomenon can occur even when the main switch is OFF as the vehicle 1 stops traveling, or the like. In other words, when the battery pack side switch 18 of any of the battery packs 7 is OFF in a state where the vehicle side switch 22 is ON, states similar to those illustrated in FIGS. 8 and 9 occur. For this reason, with respect to the battery pack side switch 18, only on the condition that the vehicle side switch 22 is OFF, the ECU 21 controls the battery pack side switch 18 to be OFF.

Figure 10:
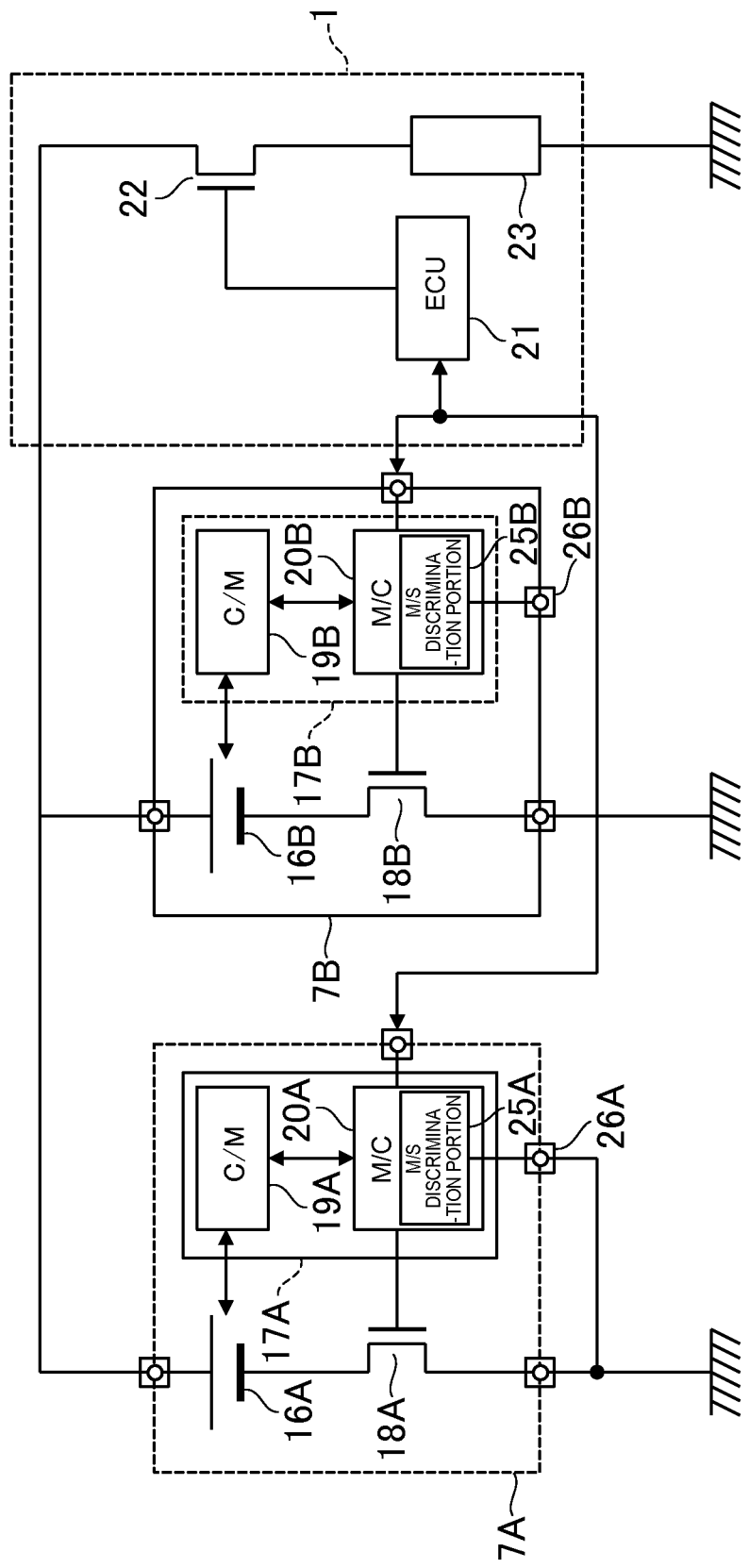
FIG. 10 is a modified example of the circuit diagram illustrated in FIG. 5.

FIG. 10 is a modified example of the circuit diagram illustrated in FIG. 5. The circuit illustrated here is an example of a case where the rechargeable battery module 16A and the rechargeable battery module 16B are connected to each other in parallel. In addition, in FIG. 10, the same members as in the previous examples are given the same reference numerals, and repeated descriptions thereof will be omitted.

In this manner, there is no problem even when the plurality of battery packs 7 are used in parallel. Furthermore, there is no problem even when the plural battery packs 7 are used in series and in parallel at the same time. In every case, the BMS 17 of one battery pack 7 among the plurality of battery packs 7 is the master. In addition, each battery pack 7 is configured to supply electric power to the vehicle 1 at the same time when the vehicle 1 travels.

Furthermore, as illustrated in FIG. 10, when the battery packs 7 are used in parallel, it is possible to use the battery packs 7 independently. However, even in this case, for convenience of transmitting the information of the installed battery pack 7 to the ECU 21, the BMS 17 of the battery pack should be the master (be in a state where only the master exists). In the example of FIG. 10, since the BMS 17A is the master as the master/slave designation contact point 26A of the battery pack 7A is connected to the battery GND, when the battery pack 7 is used independently, the battery pack 7 should be installed on the battery pack 7A side of FIG. 10.

Specific configurations illustrated in the above-described preferred embodiments are examples, and the present invention disclosed in the specification is not limited to the configuration of the specific examples. Those skilled in the art may appropriately add various changes to the disclosed preferred embodiments, for example, may change a shape, the number, or an arrangement of each member or a portion of the members. The technical range of the present invention disclosed in the specification can be considered as a range including the changes.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a plurality of detachable battery packs, each of the plurality of battery packs including a rechargeable battery module and a battery management system in a case; wherein
   in a state in which the plurality of battery packs are installed in the vehicle, one of the battery management systems is a master battery management system and another of the battery management systems is a slave battery management system, and the master battery management system is configured or programmed to perform information communication with the slave battery management system through a communication line in the vehicle and combine information from the plurality of battery packs;
   in a state in which the plurality of battery packs are detached from the vehicle, the communication line remains in the vehicle; and
   in the state in which the plurality of battery packs are detached from the vehicle, the battery management system in each respective battery pack is configured or programmed to independently control a charging state of the rechargeable battery module in the respective battery pack.

2. The vehicle according to claim 1, wherein the plurality of battery packs are configured to be charged in a state of being detached from the vehicle.

3. The vehicle according to claim 1, further comprising:
   a vehicle controller; wherein
   the master battery management system is configured or programmed to combine information from the plurality of battery packs and transmit the combined information to the vehicle controller.

4. The vehicle according to claim 1, wherein each of the plurality of battery packs further includes a master/slave discrimination portion, and the master/slave discrimination portion determines whether the battery management system in a respective battery pack is the master battery management system or the slave battery management system based on an installation state of the respective battery pack in the vehicle.

5. The vehicle according to claim 4, wherein
   each of the plurality of battery packs includes a battery pack side connector to electrically connect the battery pack to the vehicle; and
   the battery pack side connector includes a master/slave designation contact point, in which a master/slave determination signal to designate the battery management system in the respective battery pack as the master battery management system or the slave battery management system is input.

6. The vehicle according to claim 1, wherein each of the plurality of battery packs includes a battery pack side switch configured to block an output from the rechargeable battery module, and the battery pack side switch is controlled to be either ON or OFF by a signal from outside of the battery pack.

7. A vehicle comprising:
a plurality of detachable battery packs, each of the plurality of battery packs including a rechargeable battery module and a battery management system in a case; and
a vehicle side switch; wherein
in a state in which the plurality of battery packs are installed in the vehicle, one of the battery management systems is a master battery management system and another of the battery management systems is a slave battery management system, and the master battery management system is configured or programmed to perform information communication with the slave battery management system and combine information from the plurality of battery packs;
in a state in which the plurality of battery packs are detached from the vehicle, the battery management system in each respective battery pack is configured or programmed to independently control a charging state of the rechargeable battery module in the respective battery pack;
each of the plurality of battery packs includes a battery pack side switch configured to block an output from the rechargeable battery module, and the battery pack side switch is controlled to be either ON or OFF by a signal from outside of the battery pack; and
the vehicle side switch is configured to block an input from the plurality of battery packs and is controlled to be ON on a condition that all of the battery pack side switches are ON.

8. The vehicle according to claim 7, wherein the battery pack side switches are controlled to be OFF on a condition that the vehicle side switch is OFF.

9. A battery pack comprising:
a rechargeable battery module;
a battery management system;
a case which accommodates the rechargeable battery module and the battery management system; and
a master/slave discrimination portion configured or programmed to determine whether the battery management system is a master battery management system or a slave battery management system based on an installation state of the battery pack in a vehicle; wherein
in a state in which the battery pack is installed in the vehicle, the master battery management system is configured or programmed to communicate with the slave battery management system through a communication line in the vehicle and combine information from the battery packs;
in a state in which the battery pack is detached from the vehicle, the communication line remains in the vehicle; and
in the state in which the battery pack is detached from the vehicle, the battery management system is configured or programmed to independently control a charging state of the rechargeable battery module.

* * * * *